United States Patent [19]
Hollerbach

[11] Patent Number: 5,833,281
[45] Date of Patent: Nov. 10, 1998

[54] FASTENING STRUCTURE FOR A FLUID PLUG-TYPE CONNECTOR WITH A CONNECTION BORE

[75] Inventor: Bernhard Hollerbach, Steingaden/Urspring, Germany

[73] Assignee: Hoerbiger GmbH, Schongau, Germany

[21] Appl. No.: 655,196

[22] Filed: May 28, 1996

[30] Foreign Application Priority Data

Jun. 9, 1995 [AT] Austria ....................................... 979/95

[51] Int. Cl.⁶ .............................. F16D 23/00; F16D 55/00
[52] U.S. Cl. ................................. 285/382; 72/75; 285/348
[58] Field of Search .................................... 285/382, 348; 72/75

[56] References Cited

U.S. PATENT DOCUMENTS

| 905,192 | 12/1908 | Kruse ........................................... 72/75 |
| 1,919,869 | 7/1933 | Stanitz et al. .............................. 72/75 |
| 2,650,119 | 8/1953 | Booth et al. ................................ 72/75 |
| 3,441,293 | 4/1969 | Bagnulo ................................... 285/382 |
| 3,924,434 | 12/1975 | Fulier ......................................... 72/75 |
| 4,776,616 | 10/1988 | Umehara et al. ....................... 285/382 |
| 4,783,897 | 11/1988 | Basnett .................................... 285/382 |
| 5,094,481 | 3/1992 | Takikawa et al. ....................... 285/382 |
| 5,105,787 | 4/1992 | Imoeni . |
| 5,533,765 | 7/1996 | Williamson et al. ................... 285/382 |

*Primary Examiner*—Eric K. Nicholson
*Attorney, Agent, or Firm*—Watson Cole Grindle Watson, P.L.L.C.

[57] ABSTRACT

For fastening a fluid line 10" which can be inserted into a connection bore 9 with a connection end 10 there is an abutment 11 on the outer diameter in the area of the connection end 10 which, when the plug-type connection is put together, limits the axial movement of the connection end 10, by means of a permanently deformed retaining area 13 of the connection piece 8 outside the abutment 11 at least under partial contraction of the connection bore 9 which forms the retaining element.

7 Claims, 1 Drawing Sheet

5,833,281

FASTENING STRUCTURE FOR A FLUID PLUG-TYPE CONNECTOR WITH A CONNECTION BORE

BACKGROUND OF THE INVENTION

1. FIELD OF THE INVENTION

The present invention is directed to a fastening structure for a fluid plug-type connector with a connection bore in a connection piece of a fluid apparatus as well as a fluid line which can be plugged into the connection bore by means of a connection end piece with the fluid line having an abutment in the area of the connection end piece at its outer circumference and with the abutment, together with a retaining element which is fixed relative to the connection piece, limiting the axial movement of the connection end piece when the plug-type connector is put together and whereby the retaining element is comprised of a permanently deformed retaining area of the connection piece with the connection end being plugged into the connection bore outside the abutment and with the connection bore being at least partially contracted.

2. THE PRIOR ART

Such fastening structures on pumps, control elements, working cylinders, or similar elements of pneumatic or hydraulic structures are described in, e.g., EP-0 412 626 A1 or EP-0 276 483 A1, and make it possible to simultaneously use or connect different elements via fluid lines which are placed in accordance with the local conditions and which provide more flexibility with regard to the structure and thus a higher variety of applications compared to fixed connection.

DE-42 19 235 C1 in particular describes fastening structures in connection with detachable plug-type connectors in which the abutment, together with the connection end, is retained in the connection bore of the fluid line by means of a shackle-type retaining element which is pushed laterally into corresponding receiver slots of the connection bore or the connection piece of the fluid element so that it cannot be decoupled due to a pulling motion from the outside or due to working pressure from the inside.

The disadvantage with these fastening structures is the fact that the connection bore or the connection part of the fluid element must be processed in a very complicated and therefore expensive manner in order to take up the clamp-type retaining element, whereby the retaining element itself must also be manufactured in an equally complicated and expensive manufacturing process so that the required, exact interaction of the fastening structure can be ensured. This disadvantage is especially grave if no quick release and re-attachable plug-type connection is required, but instead only a secure fastening of the fluid line to the fluid element.

In the customary structures of the type described, the manufacture of a sufficiently tight and secure connection is a problem because the structure of the seals inside the abutment, which naturally is ductile, makes a correspondingly controlled deformation of the retaining are difficult or prevents it altogether.

The object of the present invention is to provide an improved fastening structure of the described type wherein the noted disadvantages of such customary structures can be avoided and wherein it is especially possible to provide a secure and simple fastening of the fluid line to the fluid element in a cost-effective manner.

SUMMARY OF THE INVENTION

The object of the invention is attained by a fastening structure of the described type wherein the generally pipe-shaped connection piece attached to the fluid element of the fluid apparatus has a step-by-step transition from a smaller bore diameter adjacent the fluid element to a larger bore diameter remote from the fluid element, in the area of the outer edge of the collar shaped abutment of the inserted connection end, the retaining area has impressed contractions on the outside all around the entire connection piece, and there is a retaining disk between these contractions and the abutment or the step-by-step transition. In this simple manner it is possible to provide a secure connection of the fluid line, which can be inserted within the connection piece of the fluid apparatus which does not require any complicated processing or any separate fastening elements. In the most simple case the retaining area can, for example, be produced by pressing together the connection piece which has the trip bore or by means of a similar, non-cutting process whereby, depending on the type and scope of the deformation carried out in this context, it is possible to reopen the fastening if necessary, for example, by prying open the deformed retaining area.

An especially simple fastening structure can be obtained in which the retaining disk, which is prevented from moving to the outside by means of pressed in contractions (preferably in the form of universal ball joints) in axial direction, ensures that the fluid line is securely fastened in the connection bore.

The required seal of the inserted connection end of the fluid line relative to the connection bore in all cases is achieved via separate seals inside the abutment whereby at least a relative torsion between the connection end and the connection bore around their mutual axis as well as a smaller axial movement of the connection end inside the boundaries set by the abutment or the retaining disk remains possible.

The invention will now be described in more detail with the help of the accompanying drawings, which show an exemplary embodiment.

DETAILED DESCRIPTION OF THE PREFERRED EMBODIMENT

Figure 1:
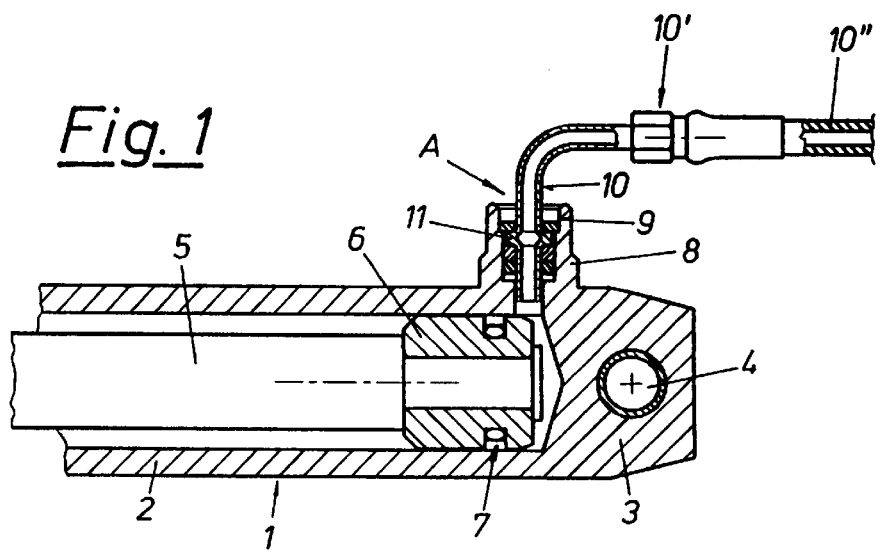
FIG. 1 shows a partial cross-section through the end of a hydraulic working cylinder from the piston end with a fastening structure in accordance with the invention for a fluid line inserted into a connection piece.

A fluid apparatus in the form of a hydraulic working cylinder 1 is generally comprised of a one-piece cylinder pipe 2 (fluid element) with a floor 3 and which has a continuous eye 4 for attaching a component (not shown in the drawing). A piston 6 is guided inside the cylinder pipe 2 on a piston rod 5 with the piston being sealed off by means of seals 7.

A generally pipe-shaped connection piece 8 is located on the side in the area of the transition for the cylinder pipe 2 to the floor 3 with the connection piece having a continuous connection bore 9 on the inside which runs to the inside of the cylinder pipe 2. A fluid line 10" is inserted into the connection bore 9 from the outside by means of a connection end 10 with the line having a collar-shaped abutment 11 around the outside diameter in the area of the connection end 10 which, when the plug-type connection is put together, the retaining element 12, which is fixed relative to the connection piece 8 (see especially FIG. 3), limits the axial movement of the connection end 10.

The retaining element 12 is comprised of a connection end 10 which is inserted into the connection bore 9 outside the abutment 11 while there is at least a partial contraction of the connection bore 9 with the retaining area 13 being permanently deformed (see FIG. 3) on the connection piece 8 which makes it possible to fasten the fluid line 10' or the connection end 10 to the connection piece 8 in a simple manner as is described in the following paragraphs with the help of FIGS. 2 and 3.

Figure 2:
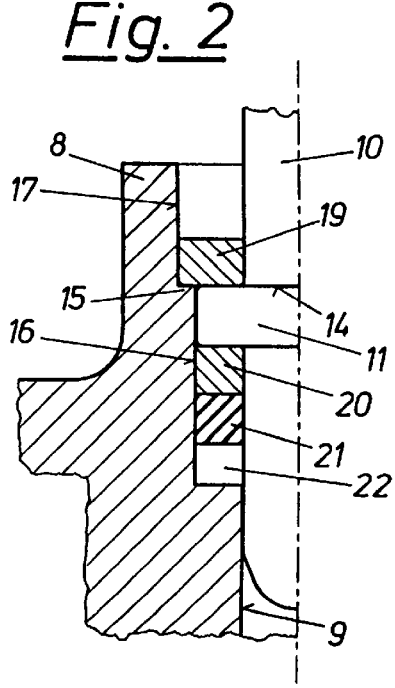
FIG. 2 and 3 show area A of FIG. 1 on an enlarged scale before (FIG. 2) and after (FIG. 3) locking of the connection end in the connection piece.
Figure 3:
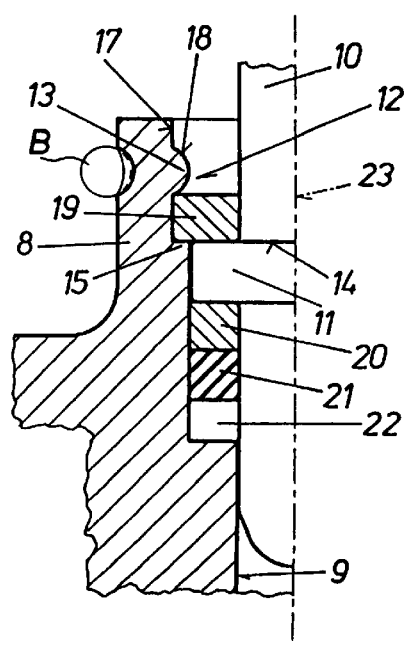
Figure 3A:
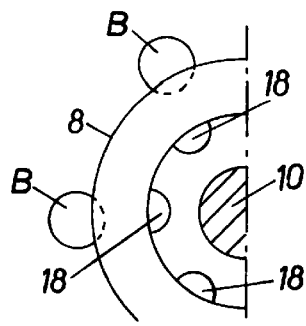
FIG. 3a is an end view of the elements depicted in FIG. 3 and showing the use of multiple tool balls to create multiple inwardly-extending protrusions in the connection piece of the hydraulic working cylinder.

The connection piece 8, as can be seen especially in FIGS. 2 and 3, has a step-by-step transition 15 from a smaller bore diameter 16 adjacent cylinder pipe 2 to a larger bore diameter 17 remote from the cylinder pipe 2 in the area of the outer edge 14 of the collar-shaped abutment 11 of the inserted connection end 10. In this area the retaining area 13 has pressed in ball joint type individual contractions 18 of the outer area 17 of the connection bore 9 all around on the connection piece 8 whereby a retaining disk 19 between these contractions 18 (e.g., six evenly distributed over the circumference) and the abutment 11 or the step-by-step transition 15 with the retaining disk distributes the retention forces equally on the collar-shaped abutment 11.

With regard to the connection piece 8 and inside the abutment 11 there are a bearing ring 20 and an annular gasket 21 whereby the conical nipple is responsible for the actual function of sealing between the connection bore 9 and the inserted connection end 10. The space 22 which remains free inside the annular gasket 21 in the drawing allows for a certain axial movement of the connection end 10 in the connection bore 9 as well as a torsion of the connection end 10 around axis 23.

In order to produce the fastening device, the connection end 10 together with the retaining disk 19 is inserted into the connection bore 9 in accordance with FIG. 2. After that the contractions 18 shown in FIG. 3 are produced around the outside edge of the connection piece 8 outside the retaining disk 19 by pressing corresponding tool balls B or tool pins or similar items from the outside. This is how the retaining disk 19 is fixed in its position on the transition 15 in the connection bore 9 and thus limits the axial movement of the connection end 10 from the connection bore 9 whereby a certain mobility toward the inside as well as the ability to carry out radial torsions is maintained.

For reasons of completeness a hose connection 10' on the fluid line 10" which is shown in FIG. 1, which is of no interest in this case, is pointed out which is connected in the customary manner to the rigid elbow of the connection end 10 and can lead to a pump, a control valve or a similar element, for example.

The displayed and explained fastening structure is simple and can be manufactured in an inexpensive manner and effectively ensures the required tight connection between the connection end 10 of the fluid line 10" and the connection bore 9 of the connection piece 8. Apart from the displayed and explained embodiment of the retaining area 13 with the individually pushed in or impressed contractions 18, it is certainly possible to selected other suitable embodiments for the deformation carried out during the fastening process. For example, it would be possible to push in tab-type retaining areas at the uppermost edge of the connection piece 8.

Also, instead of the surrounding, collar-shaped abutment 11 it would be possible, for example, to have a corresponding graduation of the connection end or a similar element as an abutment.

I claim:

1. A combination of:

a fluid line having a connection plug at an end thereof for positioning in a bore of a connection piece of a fluid apparatus, said connection plug including an abutment means, a fluid apparatus which includes a fluid element and a generally pipe-shaped connection piece which extends away from said fluid element, said connection piece defining a stepped bore comprising a first portion adjacent said fluid element with a first internal diameter and a second portion remote from said fluid element with a second internal diameter, said second internal diameter being larger than said first internal diameter, said abutment means of said connection piece fitting within said first portion of said bore when said connection plug is positioned within said connection piece, and a retaining disc located within said second portion of said bore of said connection piece, said connection piece including at least one indentation in an outer surface thereof defining at least one inwardly-extending protrusion in said second portion of said bore for locking said retaining disc and said abutment means in said connection piece and limiting axial movement of said abutment means of said connection plug within said first portion of said bore of said connection piece, said at least one inwardly-extending protusion positioning said retaining disc against a shoulder provided between said first and second portions of said stepped bore.

2. The combination of claim 1, wherein said fluid apparatus comprises a hydraulic working cylinder.

3. The combination of claim 1, wherein said fluid element comprises a cylinder pipe containing a movable piston.

4. The combination of claim 1, wherein said connection plug includes a bearing ring and an annular gasket between said abutment means and an end thereof facing said fluid element.

5. The combination of claim 4, wherein said abutment means comprises a collar.

6. The combination of claim 1, wherein said at least one indentation comprises a plurality of indentations provided by radially inwardly pressing a plurality of solid objects positioned as a ring around said connection piece inwardly of a free end thereof.

7. The combination of claim 6, wherein said solid objects are balls.

* * * * *